US007256773B2

United States Patent
Kolmykov-Zotov et al.

(10) Patent No.: US 7,256,773 B2
(45) Date of Patent: Aug. 14, 2007

(54) DETECTION OF A DWELL GESTURE BY EXAMINING PARAMETERS ASSOCIATED WITH PEN MOTION

(75) Inventors: Alexander J. Kolmykov-Zotov, Sammamish, WA (US); Shiraz Somji, Kenmore, WA (US); Matt Lerner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/456,632

(22) Filed: Jun. 9, 2003

(65) Prior Publication Data

US 2004/0246240 A1 Dec. 9, 2004

(51) Int. Cl.
- *G09K 11/06* (2006.01)
- *G08C 21/00* (2006.01)
- *G09G 5/08* (2006.01)
- *G09G 5/00* (2006.01)
- *G09G 1/00* (2006.01)
- *G09G 3/28* (2006.01)
- *G09G 3/22* (2006.01)

(52) U.S. Cl. .......... 345/179; 178/18.01; 178/19.01; 345/157; 345/180; 345/182; 345/183

(58) Field of Classification Search .......... 345/179
See application file for complete search history.

(56) References Cited

U.S. PATENT DOCUMENTS

| | | | | |
|---|---|---|---|---|
| 5,572,651 A | * | 11/1996 | Weber et al. ............... | 715/863 |
| 5,666,113 A | * | 9/1997 | Logan .......................... | 341/34 |
| 5,864,635 A | * | 1/1999 | Zetts et al. .................. | 382/187 |
| 6,094,197 A | * | 7/2000 | Buxton et al. .............. | 715/863 |
| 6,229,525 B1 | * | 5/2001 | Alexander ................... | 345/157 |
| 7,002,560 B2 | * | 2/2006 | Graham ....................... | 345/179 |
| 2002/0056575 A1 | * | 5/2002 | Keely et al. ............. | 178/18.01 |
| 2002/0057263 A1 | * | 5/2002 | Keely et al. ................ | 345/179 |

* cited by examiner

*Primary Examiner*—Sumati Lefkowitz
*Assistant Examiner*—Alexander S. Beck
(74) *Attorney, Agent, or Firm*—Banner & Witcoff, Ltd.

(57) ABSTRACT

Systems, methods, and computer-readable media are used to determine whether specific electronic pen gestures with respect to pen-based computing systems should be processed as "press-and-hold" gestures (e.g., to activate right mouse button click actions). Such methods may include: (a) measuring two different parameters associated with pen interaction or orientation with respect to a digitizer during a pen-down event; and (b) determining whether the pen-down event constitutes a press-and-hold gesture based, at least in part, on the measured parameters. In some instances, if the systems and methods cannot immediately determine whether a press-and-hold gesture is intended, measurements may be made again (as many times as necessary or until a time-out occurs) such that the determining step can be performed one or more additional times taking into consideration the additional parameter measurement data collected since the original parameter measurements. Additionally, standards for determining whether a dwell gesture constitutes a press-and-hold gesture may be set and/or adjusted, taking into consideration features associated with a specific user's use of the pen-based computing system (e.g., customization of standards based on model user input and/or a user's past performance of press-and-hold actions).

60 Claims, 8 Drawing Sheets

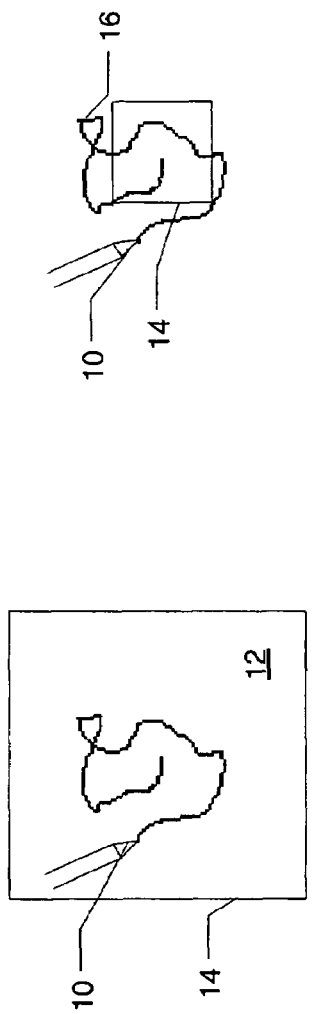
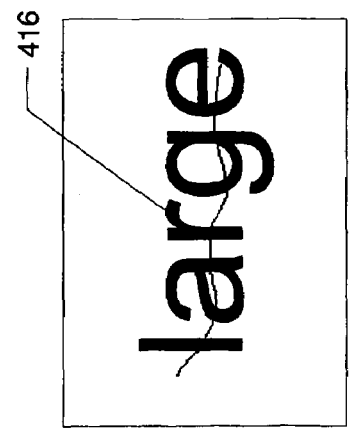
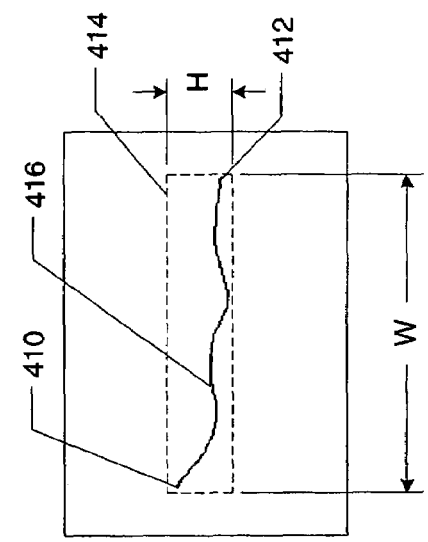
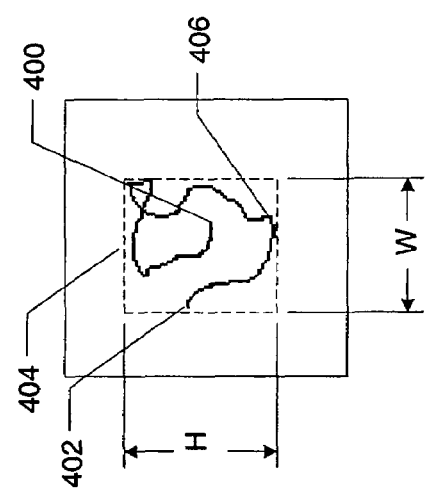

DETECTION OF A DWELL GESTURE BY EXAMINING PARAMETERS ASSOCIATED WITH PEN MOTION

FIELD OF THE INVENTION

This invention generally relates to systems, methods, and computer-readable media for detecting a dwell gesture made using an electronic pen in a pen-based computing system and determining whether the gesture is intended to constitute a "press-and-hold" action. A "press-and-hold" action, in at least some examples of pen-based computing systems, may be used to activate and/or access various functions of the computer operating systems, e.g., the functions of a conventional right mouse button click.

BACKGROUND

Typical computer systems, especially computer systems having graphical user interface (GUI) systems, such as a WINDOWS® operating system available from Microsoft Corporation of Redmond, Wash., are optimized for accepting user input from one or more discrete input devices, such as a keyboard for entering text, and a pointing device, such as a mouse with one or more buttons, for operating the user interface. The ubiquitous keyboard and mouse interface provides for fast creation and modification of documents, spreadsheets, database fields, drawings, photos, and the like.

Recently, however, pen-based computing systems (also called "stylus-based computing systems" or "tablet PCs" in this specification) have become increasingly popular. At least some of these systems have eliminated the need for the traditional keyboard and mouse interface by allowing users to input all data into the system, including all data used to control the interface (e.g., tasks typically performed using the mouse in a conventional interface), using an electronic pen (also called a "stylus" in this specification).

While using only a pen to input data into a computer may sound somewhat restrictive, in practice, systems and methods have been developed that allow users great flexibility in interacting with pen-based computing systems using only the pen as an input device. For example, the pen may be equipped with one or more buttons or other features to augment its capabilities. As a more specific example, one or more buttons may be provided on the pen to mimic and/or activate the functions of the left and right buttons of a conventional mouse. As another example, the pen may be implemented as a typical "pencil" or "pen" in which one end constitutes a writing element (that adds electronic ink to an electronic document) and the other end constitutes an "eraser" end that, when moved across the digitizer screen, indicates portions of the display to be erased. Features such as these have greatly increased the flexibility and acceptability of modern pen-based computing systems.

For some users, however, one or more buttons on an electronic pen to mimic and/or activate the functions of a mouse's left and/or right buttons can be difficult to use. For example, the pen's buttons typically are small and may be difficult for some users to locate and/or accurately activate. Additionally, the presence of the buttons in some instances may result in inadvertent and undesired activation of a button and its associated functions, which can interrupt and adversely impact the desired input data flow. As another factor, the inclusion of one or more buttons on an electronic pen adds additional hardware to the system that may become damaged or inoperative by accident and/or through normal wear-and-tear. These factors can lead to substantial frustration and costs for pen-based computer users.

Because of the various difficulties described above, some pen-based computing systems avoid the use of buttons on the pen by allowing the pen to activate and access the functions of the left and right mouse buttons in different ways. As an example, in some pen-based computing systems, simply tapping or placing the pen tip on or near the digitizer screen is used to activate or access the conventional left mouse button functions. In some such systems, tapping on an electronic document with the pen can be used to mimic a left mouse button click to place the cursor at that location in the document, and tapping on a user interface element (such as a toolbar item) can be used to mimic a left mouse button click to allow performance of the function(s) associated with that interface element (e.g., to activate a pull down menu, to switch documents or applications, to activate and/or perform a specific function, etc.). Holding the pen slightly above the digitizer surface without touching it (also known as a "hover" action because the pen "hovers" above the digitizer surface) can be used, in at least some pen-based computing systems, to function in the same manner as moving a mouse on a conventional user interface without clicking a button, which may result, for example, in display of a shadow cursor, in a change in appearance of information directly under the pen tip, in display of additional information associated with the information directly under the pen tip, or the like.

In some systems of this type, the functions of a mouse button "right click" can be activated or accessed using only a pen by pressing the pen tip onto the digitizer screen and/or hovering the pen tip slightly above the digitizer screen and then holding it in place for a predetermined amount of time. This action (also called a "press-and-hold" in this specification) may be used, in at least some pen-based computing systems, to activate or access the functions associated with a conventional right button click on a conventional mouse (e.g., display of a drop down menu with various available functions, etc.).

A press-and-hold action, however, also can be difficult for some users to perform because it can be difficult, for at least some, to hold a pen perfectly steady for a predetermined time period (in some systems, about one second). To remedy this problem, some pen-based computing systems determine whether a press-and-hold action is intended by determining whether the pen stays within a relatively small predetermined space (e.g., 8×8 digitizer pixels) for the duration of a press-and-hold determination time (e.g., 750 to 1000 ms in some examples). FIG. 1 illustrates an example of this situation. If, after bringing the pen tip 10 to the digitizer surface 12, the pen tip 10 remains within a predetermined area 14 surrounding its initial contact point for a predetermined time, the gesture is considered to be a press-and-hold gesture, and it is processed in this manner. If, at any time during the press-and-hold determination time, the pen tip 10 strays outside the predetermined area 14, the gesture is determined to not constitute a press-and-hold.

While the above procedure allows users to more easily activate or access functions of a right mouse button click using only a pen in a pen-based computing system, there are some difficulties associated with this procedure as well. For example, if the predetermined press-and-hold area 14 is defined too small (see FIG. 2), it is easy for the pen tip 10 to inadvertently drift outside the predetermined area 14 (particularly for some users), shown at reference number 16, resulting in non-activation of press-and-hold processing. This feature can make it difficult for some users to activate press-and-hold processing. On the other hand, if the predetermined area 14 is defined too large (e.g., see FIG. 1), press-and-hold processing may be activated too easily, and at some times when it is not intended. For example, an attempt to draw a small stroke (such as a bullet point and the like) or make a small block selection or scratch out of a small area, may be inadvertently interpreted as an attempt to activate or access a press-and-hold action, resulting in undesired firing of press-and-hold processing. Both of these situations can adversely affect data input, resulting in errors and/or user frustration.

Accordingly, at least some aspects of the present invention seek to overcome the various difficulties identified above and to make press-and-hold processing easier, quicker, and more reliable to activate.

SUMMARY

Aspects of the present invention generally relate to systems, methods, and computer-readable media for determining whether specific electronic pen gestures with respect to digitizer screens of pen-based computing systems should be processed as "press-and-hold" gestures. Some more specific aspects of this invention relate to systems, methods, and computer-readable media for performing methods that include: (a) measuring a first parameter associated with pen interaction or orientation with respect to a digitizer during a pen-down event; (b) measuring a second, different parameter associated with pen interaction or orientation with respect to the digitizer during the pen-down event; and (c) determining whether the pen-down event constitutes a press-and-hold gesture based, at least in part, on the first and second parameters. In some examples of this invention, if the systems and methods cannot immediately determine whether a press-and-hold gesture is intended, parameter measurements may be made again (as many times as necessary or until a time-out event occurs) such that the determining can be performed one or more additional times taking into consideration the additional parameter measurement data collected since the original parameter measurements. Additional, optional aspects of this invention relate to initially setting and/or adjusting standards for determining whether a dwell gesture constitutes a press-and-hold gesture based on a specific user's use of the pen-based computing system (e.g., customizing the standards based on user input).

BRIEF DESCRIPTION OF THE DRAWINGS

The foregoing summary of aspects of the invention, as well as the following detailed description of various examples, is better understood when read in conjunction with the accompanying drawings, which are included by way of example, and not by way of limitation with regard to the claimed invention. In the figures:

FIG. 1 illustrates an example successful effort to activate a press-and-hold action;

FIG. 2 illustrates an example unsuccessful effort to activate a press-and-hold action;

FIGS. 6a through 6c help illustrate stroke features that can be used as measurement parameters in some examples of the present invention;

DETAILED DESCRIPTION OF THE DRAWINGS

Figure 3:
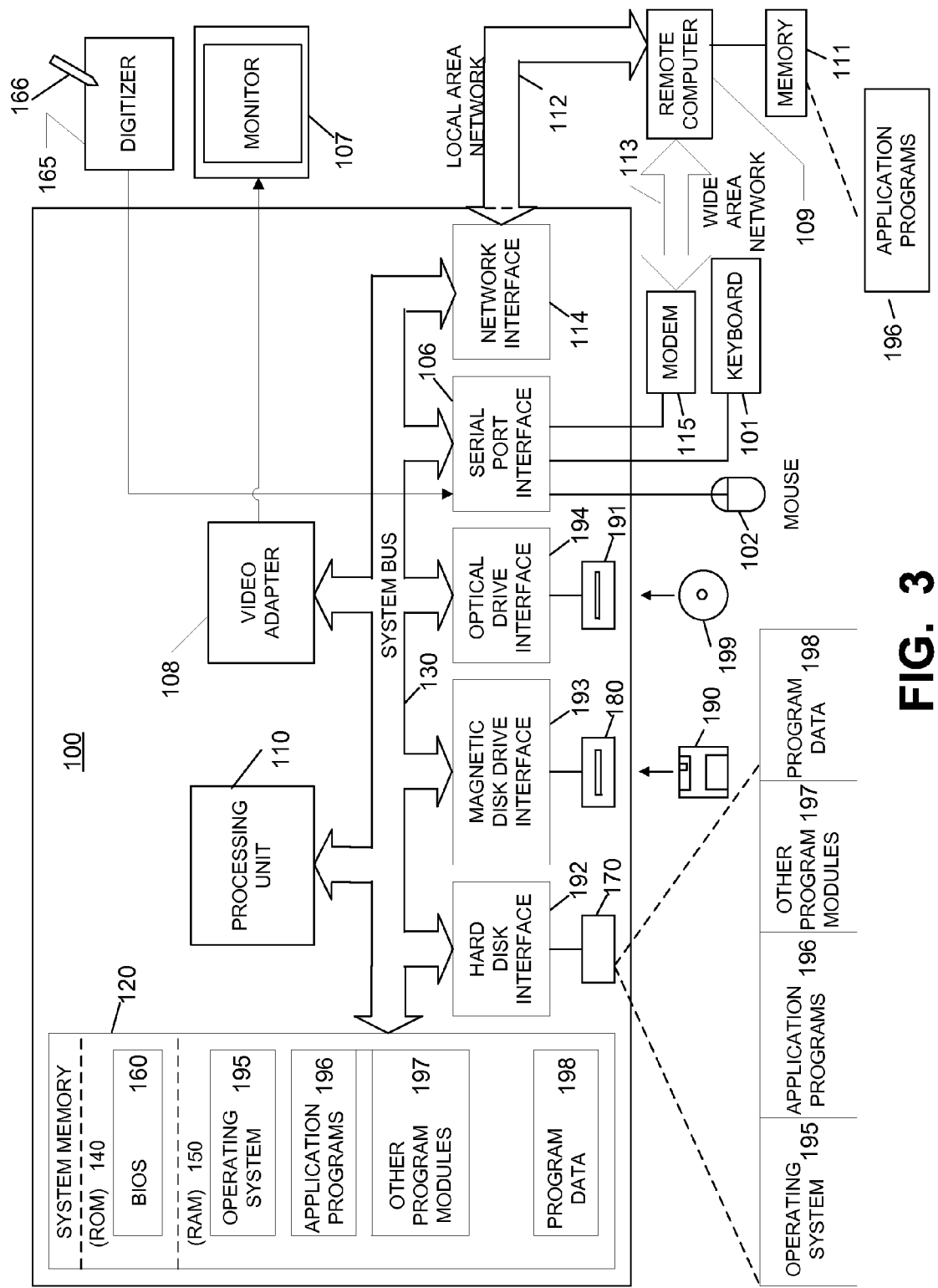
FIG. 3 illustrates an example general-purpose computer that may be used in accordance with one or more aspects of the present invention.

Various specific examples of the invention are described in detail below in conjunction with the attached drawings. To assist the reader, this specification is broken into various subsections, as follows: Terms; General Description of Detecting a Press-and-Hold Action Using Electronic Pen Parameters; Example Hardware Useful with the Invention; Specific Examples of the Invention; and Conclusion.

A. TERMS

The following terms are used in this specification, and unless otherwise noted or clear from the context, these terms have the meanings provided below.

"Ink" or "Electronic Ink" or "Digital Ink"—A sequence or set of one or more handwritten strokes on a pen-based computing system. A sequence of strokes may include strokes in an ordered form. The sequence may be ordered by the time the stroke was captured or by where the strokes appear on a page. Other orders also are possible. A set of strokes may include sequences of strokes or unordered strokes or any combination thereof.

"Stroke"—A sequence or set of captured points. For example, when rendered on a computer screen or in another manner, the sequence of points may be connected with lines. Alternatively, a stroke may be represented as a point and a vector in the direction of the next point. Further, a stroke may be referred to as a simple list (or array or table) of points. In short, a stroke is intended to encompass any representation of points or segments relating to ink, irrespective of the underlying representation of points and/or what connects the points.

"Point"—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, $\Theta$), three dimensional coordinates ((X, Y, Z), (r, $\Theta$, $\rho$), (X, Y, t (where t is time)), (r, $\Theta$, t)), four dimensional coordinates ((X, Y, Z, t) and (r, $\Theta$, $\rho$, t)), and other techniques as known in the art.

"Pen"—Any type of user input device useful in entering ink into an electronic document.

"Pen-Down Event"—An event that is initiated at the time a pen approaches proximate to, makes contact with, and/or otherwise interacts with a digitizer. Typically, a pen-down event will end at the time the pen leaves the digitizer surface, moves a distance away from the surface, and/or otherwise stops interacting with the digitizer (e.g., the digitizer may no longer sense the presence of the pen (also called a "pen-up event" in this specification). Because some pens are "active," a pen-down event may begin before the pen contacts the digitizer surface (i.e., the digitizer may sense the presence of the pen as it approaches the digitizer surface and as it remains proximate to the digitizer surface). Additionally, a pen-down event may continue after the pen actually leaves the digitizer surface (i.e., the digitizer may sense the presence of the pen after it leaves the digitizer surface, while it remains in proximity to the digitizer surface). In some instances or some systems, a pen-down event may require actual physical contact between the pen and the digitizer surface.

"Press-and-hold"—A pen-down event that lasts a sufficient time and with a sufficient lack of pen positional change so as to activate predetermined processing by the computing system.

"Render" or "Rendered" or "Rendering"—The process of determining how information (including text, graphics, and/or electronic ink) is to be displayed, whether on a screen, printed, or output in some other manner.

"Computer-Readable Medium"—Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules, or other data. "Computer storage media" includes, but is not limited to: RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

B. GENERAL DESCRIPTION OF DETECTING A PRESS-AND-HOLD ACTION USING ELECTRONIC PEN PARAMETERS

In general, this invention relates to systems, methods, and computer-readable media for detecting a dwell gesture made using an electronic pen in a pen-based computing system and determining whether the gesture is intended to constitute a "press-and-hold" action. Aspects of this invention relate to methods that include: (a) measuring a first parameter associated with pen interaction or orientation with respect to a digitizer during a pen-down event; (b) measuring a second parameter associated with pen interaction or orientation with respect to the digitizer during the pen-down event, wherein the second parameter differs from the first parameter; and (c) determining whether the pen-down event constitutes a press-and-hold gesture based, at least in part, on the first parameter and the second parameter. In some examples of this invention, if the systems and methods cannot determine after some measurements whether a press-and-hold gesture is intended, additional measurements may be taken (as many times as necessary or until a time-out event occurs) such that the determining can be performed one or more additional times taking into consideration the additional parameter measurement data collected since the earlier parameter measurements.

A wide variety of parameters may be evaluated and considered during performance of methods according to this invention. For example, at least one of the measured parameters may include at least one member selected from the group of: pen movement in the X direction; pen movement in the Y direction; pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the X direction; velocity or acceleration of pen movement in the Y direction; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation. As more specific examples, in at least some examples of the invention, the measured parameters may include: a pen steadiness parameter; information regarding stroke size (e.g., stroke width, stroke height, stroke width to height ratio, stroke height to width ratio, and the like); a pen pressure parameter; a pen angle with respect to the digitizer; and a pen movement direction, velocity, or acceleration. For example, when the stroke width to height ratio exceeds a predetermined value or changes at a predetermined rate, the pen-down event may be determined not to constitute a press-and-hold gesture, in some examples of this invention. As still another example, when the stroke width to height ratio exceeds a predetermined value or changes at a predetermined rate, the pen-down event may be determined, in at least some instances, to constitute a selection action.

Additional aspects of this invention relate to initially setting and/or adjusting standards for determining whether a dwell gesture constitutes a press-and-hold gesture. For example, these standards may be set and/or adjusted over time, taking into consideration features of a specific user's input to and use of the pen-based computing system. As a more specific example, in at least some examples of systems and methods according to the invention, at least one standard for determining whether a pen-down event constitutes a press-and-hold gesture is set and/or adjusted based, at least in part, on model user press-and-hold gesture input. In other words, at an appropriate time (e.g., when a user initially sets up a pen-based computing system's operating system) he or she may be asked to provide one or more sample "press-and-hold" operations, and the system may set and/or adjust steadiness standards and/or other standards for a press-and-hold gesture determination based on these sample operation(s). As another specific example, at least one standard for determining whether a pen-down event constitutes a press-and-hold gesture may be adjusted over time based on previous determinations of whether previous pen-down events constituted press-and-hold gestures. In other words, if systems and methods according to some examples of the invention sense that a user has made one or more failed attempts to activate press-and-hold processing and/or if they sense that a user has erroneously activated press-and-hold processing, they can adjust standards for activating press-and-hold processing based on this information. In this way, systems and methods according to some examples of the invention can customize to a specific user's typical input characteristics.

Still additional aspects of this invention relate to systems for performing various methods, such as the methods described above. Such systems may include: (a) a digitizer for receiving input; and (b) a processor for measuring various pen orientation or interaction parameters, such as the parameters discussed above, and determining whether a specific pen-down event should be processed as a press-and-hold gesture. As another example, such systems may include: any suitable means for measuring the first parameter, any suitable means for measuring the second parameter, and any suitable means for determining whether the pen-down event constitutes a press-and-hold gesture based, at least in part, on the first and second parameters.

Additional aspects of the present invention relate to computer-readable media including computer-executable instructions stored thereon for performing the various methods described above.

The terms "first parameter" and "second parameter" are used herein as a matter of convenience, to simply indicate that the two parameters are different from one another.

Use of the terms "first" and "second" should not be construed as requiring any specific temporal order in which the measurements must take place. Rather, in systems, methods, and computer-readable media according to this invention, the first and second parameters can be measured in any suitable order, simultaneously, in an overlapping manner, over differing time periods or lengths of time, and/or in a changing order without departing from the invention. Additionally, any desired number of parameters may be measured and considered in the determination without departing from the invention.

Various aspects and examples of the present invention will be described in detail below in conjunction with the attached figures. The description and figures should be construed as examples of the invention and not as limitations on the invention.

C. EXAMPLE HARDWARE USEFUL WITH THE INVENTION

FIG. 3 illustrates a schematic diagram of an illustrative example general-purpose digital computing environment that can be used to implement various aspects of the present invention. In FIG. 3, a computer 100 includes a processing unit 110, a system memory 120, and a system bus 130 that couples various system components, including the system memory 120, to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS) containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer-readable media that can store data that is accessible by a computer, such as magnetic cassettes, flash memory cards, punch cards, digital video disks, Bernoulli cartridges, random access memories (RAMs), read only memories (ROMs), and the like, also may be used in the example operating environment without departing from the invention.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus, but they may be connected by other interfaces, such as a parallel port, game port, a universal serial bus (USB), or the like. Further still, these devices may be coupled directly to the system bus 130 via an appropriate interface (not shown). A monitor 107 or other type of display device also is connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand electronic ink input. Although a direct connection between the pen digitizer 165 and the serial port interface 106 is shown, in practice, the pen digitizer 165 may be coupled to the processing unit 110 directly, to a parallel port, to another interface, and to the system bus 130, as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as remote computer 109. The remote computer 109 can be a server, a router, a network PC, a peer device, or other common network node, and it typically includes many or all of the elements described above relative to the computer 100, although only a memory storage device 111 has been illustrated in FIG. 3. The example logical connections depicted in FIG. 3 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 may be connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device 111.

It will be appreciated that the network connections shown are illustrative and other techniques for establishing a communications link between the computers can be used. The existence of any of various well-known protocols such as TCP/IP, UDP, Ethernet, FTP, HTTP, and the like is presumed, and the system can be operated in a client-server configuration to permit a user to retrieve web pages from a web-based server. Any of various conventional web browsers can be used to display and manipulate data on web pages.

Figure 4:
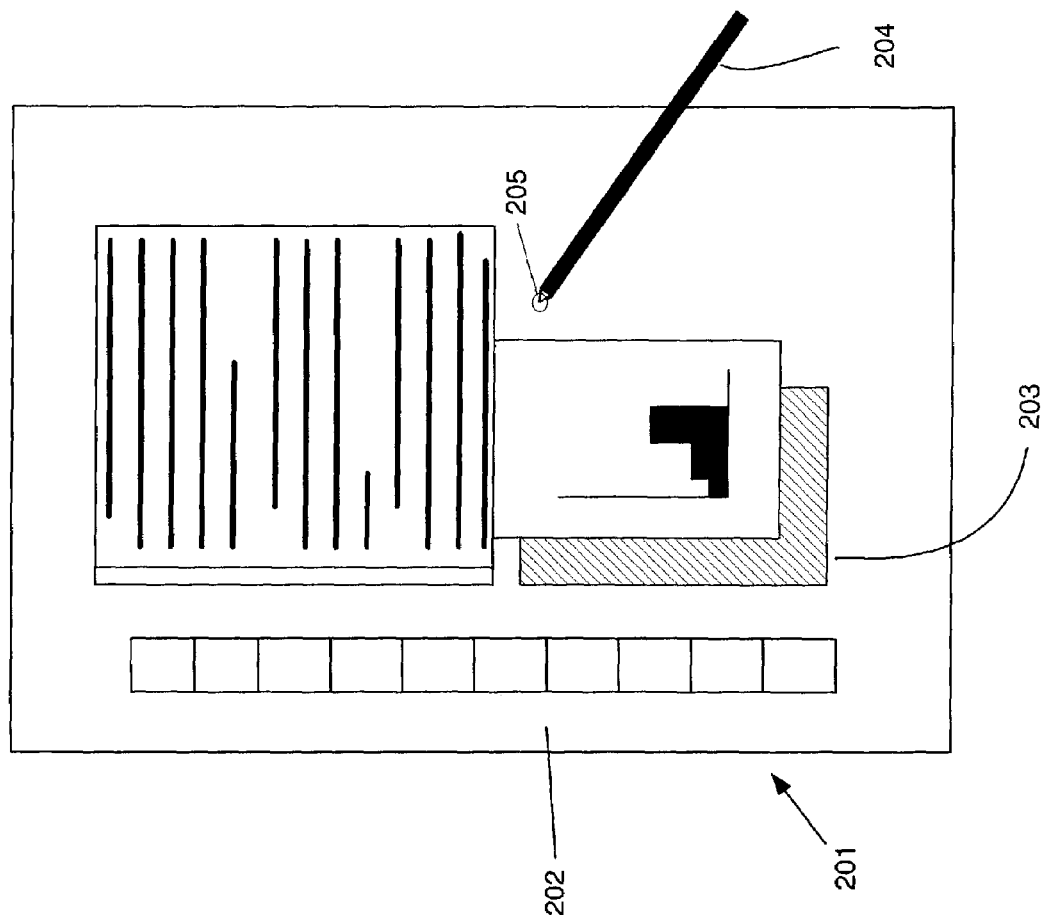
FIG. 4 illustrates a display for an example pen-based computing system that may be used in accordance with aspects of the present invention.

FIG. 4 illustrates an illustrative pen or stylus-based computing system 201 (e.g., a tablet PC, PDA, or the like) that can be used in accordance with various aspects of the present invention. Any or all of the features, subsystems, and functions in the system of FIG. 3 can be included in the computing system of FIG. 4. Pen or stylus-based computing system 201 includes a large display surface 202, e.g., a digitizing flat panel display, such as a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as pen digitizers available from Mutoh Co. or Wacom Technology Co. Other types of pen digitizers, e.g., optical digitizers, also may be used. The pen or stylus-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its capabilities. In one example, the stylus 204 could be implemented as a "pencil" or "pen," in which one end constitutes a writing portion and the other end constitutes an "eraser" end that, when moved across the display, indicates portions of the display to be erased. Other types of input devices, such as a mouse, a trackball, or the like could be used. Additionally, a user's own finger could be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as stylus 204. Region 205 shows a feedback region or contact region permitting the user to determine where the stylus 204 has contacted the display surface 202.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the Net programming model from Microsoft Corporation. These platforms are commercially available and known in the art.

The invention now will be described in conjunction with the remaining figures, which illustrate various examples of the invention and information to help explain the invention. The specific figures and information contained in this detailed description should not be construed as limiting the invention.

D. SPECIFIC EXAMPLES OF THE INVENTION

As described above, in at least some pen-based computing systems, at least some of the input used to control the user interface is entered into the computing system using an electronic pen, e.g., by tapping the pen tip on the screen and/or by activating functions with the pen using a "press-and-hold" action. Examples of the present invention include systems, methods, and computer-readable media that help distinguish press-and-hold actions from other actions performed by the pen, such as making small strokes (e.g., bullet points, scratch outs, etc.) or making selections of narrow or small strokes and/or text.

Figure 5B:
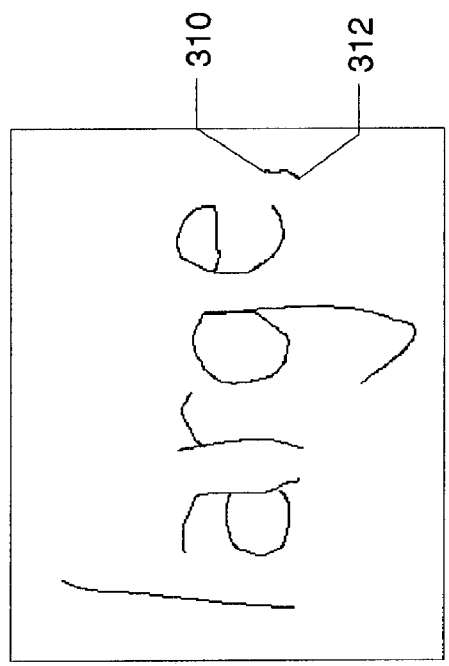
FIGS. 5a and 5b help illustrate the difficulties involved in determining whether specific dwell gestures constitute a press-and-hold action, a small selection action, or a small stroke.
Figure 5A:
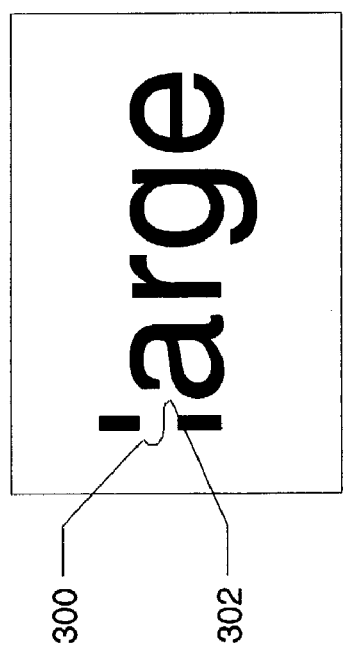

FIGS. 5a and 5b illustrate examples of potentially confusing and misinterpreted pen input with respect to the issues raised above. Specifically, as shown in FIG. 5a, a pen-down event occurred at point 300, immediately to the left of the letter "l" in the word "large." The pen-up event occurred at point 302, immediately to the right of that same letter "l." In this example, it may be difficult for pen-based computing systems and methods to determine whether the user had intended to: (a) activate press-and-hold processing (e.g., activate a right mouse button click), (b) select the letter "l" in the word "large", or (c) take some other action (e.g., draw a stroke, make a scratch out, etc.). In FIG. 5b, to write the comma after the ink word "large," a pen-down event occurred at point 310 and a pen-up event occurred at point 312. In this example, it may be difficult for pen-based computing systems and methods to determine whether the user had intended to: (a) add electronic ink corresponding to a comma, (b) activate press-and-hold processing, or (c) take some other action. Erroneous activation of press-and-hold processing and/or erroneous failure to activate press-and-hold processing when desired can be disruptive and frustrating for users, and it potentially can inject errors into the document. On the other hand, long waiting periods while pen-based computing systems and methods determine whether press-and-hold processing is being requested also can be frustrating to users.

Examples of the present invention, in at least some instances, improve the accuracy of a determination of whether a dwell gesture (or a short or narrow stroke) is intended to constitute a press-and-hold action or some other action. Additionally, in at least instances, examples of the present invention enable a more rapid determination of whether a particular gesture is intended to constitute a press-and-hold action or some other action.

In general, methods according to at least some examples of this invention include: (a) measuring a first parameter associated with pen interaction or orientation with respect to a digitizer during a pen-down event; (b) measuring a second, different parameter associated with pen interaction or orientation with respect to the digitizer during the pen-down event; and (c) determining whether the pen-down event constitutes a press-and-hold gesture (and/or some other action) based, at least in part, on the first parameter and the second parameter.

While, as explained above, various parameters may be measured in systems and methods according to the invention, examples of two useful parameters include a parameter that measures pen steadiness during the pen-down event and a parameter that provides information regarding stroke size during the pen-down event. The pen steadiness factor may be any suitable measurement indicating the degree to which a pen stays at a particular point and/or within a predetermined area with respect to the digitizer screen during the pen-down event. If the pen stays within a given area and/or moves very slowly, it is considered to be more "steady." The steadier the pen during the pen-down event, the more likely it is that the user is attempting to activate press-and-hold processing. If the pen is not steady during the pen-down event, this indicates a lower likelihood that press-and-hold processing is intended.

Any suitable way for measuring the various parameters may be used without departing from the invention. For example, to measure pen steadiness, systems and methods according to the invention may measure the location of the pen with respect to the digitizer screen (e.g., the X and/or Y coordinates) and/or the change in location of the pen with respect to the digitizer screen over time (e.g., the change in X and/or Y coordinates over time (velocity or acceleration of pen movement)).

The following provides an even more concrete example of steadiness parameter measurement that may be used in accordance with some examples of this invention. Commercially available pen-based computing systems include digitizers capable of periodically sending data to the computer processor indicating the location of the pen tip with respect to the digitizer screen (e.g., the X and Y coordinates of the pen tip location on the digitizer screen). In some available systems, the pen tip coordinates may be sent at predetermined intervals, such as once every 7.5 ms. Accordingly, when a user begins some action that may potentially constitute a press-and-hold action (e.g., a pen-down event), the digitizer tells the processor the location of the pen tip every 7.5 ms (or another suitable interval). If a press-and-hold action is intended, typically the pen tip will not move much while the user is attempting to activate press-and-hold processing, although some amount of drift in the pen tip location can be expected, as some users may not be able to hold a pen perfectly still for an extended time period. Accordingly, during an attempted press-and-hold activation, the processor will receive a list of pen tip location points collected as the press-and-hold is attempted. A list of potential digitizer points over time when attempting to activate a press-and-hold action may look as follows:

| Time (ms) | Digitizer Coordinates | "Steadiness Factor" |
| --- | --- | --- |
| 0.0 | 100, 200 | S = 3 (i.e., 3 time intervals with no change in pen location) |
| 7.5 | 100, 200 | |
| 15.0 | 100, 200 | |
| 22.5 | 102, 200 | S = 4 |
| 30.0 | 102, 200 | |
| 37.5 | 102, 200 | |
| 45.0 | 102, 200 | |
| 52.5 | 100, 202 | S = 1 |
| 60.0 | 101, 203 | S = 1 |

The "steadiness factor," or "S" in this example, simply constitutes the number of consecutive measurements in which the X and Y coordinates of the pen tip location did not change from the previous measurement. Accordingly, a "steadiness parameter for the action" may be determined from the data in any suitable manner. For example, an average and/or median steadiness factor may be used as the steadiness parameter. For the data provided in the listing above, the steadiness parameter corresponding to the average steadiness factor over the 60 ms measurement time period is 2.25. In this example, the higher the steadiness parameter, the steadier the pen over the time period, and the more likely the pen-down event constituted a press-and-hold gesture.

Of course, if desired, a press-and-hold gesture may have a predetermined lower time limit. In some examples of the invention, an action must continue for at least 300 ms or even 400 ms before it can be considered a press-and-hold gesture. This lower time limit allows time for collection of data for proceeding with a determination of press-and-hold processing in those examples of the invention that include a lower limit.

As is readily apparent, steadiness may be measured in a number of different ways and in any suitable manner without departing from the invention. For example, rather than counting consecutive measurements where the pen did not move, systems and methods according to some examples of the invention could count the overall number of times during the measurement time period that the pen is located in a common position and use the average or median number as the steadiness parameter. As another example, systems and methods according to the invention could simply determine the number of times the X and Y coordinates change and use this value as a steadiness parameter (e.g., a high percentage of changes over a predetermined number of measurements indicates an unsteady pen location whereas a low percentage of changes indicates a steady pen location). As still another example, systems and methods according to the invention could measure the pen tip movement distance between readings and use this value (e.g., average or median tip movement) as a steadiness parameter. Other measurements also are possible without departing from the invention.

Another useful example measurement parameter associated with pen interaction or orientation with respect to a digitizer during a pen-down event may relate to information regarding the "stroke size" during the pen-down event. Various stroke size parameters may be used for this measurement without departing from the invention, including, but not limited to: overall stroke length; overall stroke width; overall stroke height; change in stroke length, width, and/or height; stroke width to height ratio; and the like.

Like stroke steadiness, information regarding stroke size can be collected as a pen-down event is occurring (e.g., overall stroke width from pen-down to each measurement time, overall stroke height from pen-down to each measurement time, overall stroke length from pen-down to each measurement time, etc.). Overall stroke width to stroke height ratio is one convenient parameter useful in determining whether a given stroke is intended to constitute a press-and-hold action. Strokes with a high width to height ratio are less likely to constitute press-and-hold actions as compared to strokes having a low width to height ratio.

FIGS. 6a through 6c help illustrate this stroke size parameter and its determination. For example, FIG. 6a illustrates a stroke 406 as formed from a pen-down event at point 400 to a measurement time at point 402. During this time, the pen tip has moved as shown, and a "bounding box" shown at 404 may enclose the entire stroke 406 produced during this time period. By dividing the overall bounding box width W by its overall height H, one can obtain a stroke width to height ratio of the stroke from the pen-down event to the measurement time. This width to height ratio can be used as a parameter in determining whether a specific dwell gesture is intended to constitute a press-and-hold action.

FIG. 6a illustrates an example in which the stroke width to stroke height ratio is somewhat less than 1. The lower the width to height ratio, the more likely a given stroke is intended to constitute a press-and-hold action. FIGS. 6b and 6c, on the other hand, illustrate a typical stroke as it might appear when a user is attempting a "select" action. As illustrated in FIG. 6b, the pen-down event for the stroke 416 occurred at the left side of the drawing at point 410, and a measurement is taken when the pen tip is located at point 412. In this instance, as would be typical when many selection actions were intended, the overall stroke width W is substantially greater than the overall stroke height H, resulting in a relatively high stroke width to height ratio parameter (W/H of approximately 5 in the illustrated example). As can be seen from FIG. 6c, in this instance, the user intended stroke 416 to be processed as a "select" action for selecting the word "large."

As will be readily apparent from the above discussion, stroke size information may be used in a variety of different ways to provide a parameter for determining whether a given pen-down event constitutes a press-and-hold action. For example, rather than determining stroke width to height ratios, the stroke height to width ratio, overall stroke width, change in stroke width, change in stroke width to height ratio, change in stroke height to width ratio, overall stroke length, change in stroke length, or other parameters may be determined and used as a stroke size parameter without departing from the invention.

Additionally, a wide variety of parameters may be used in determining whether a specific gesture constitutes a press-and-hold action. Examples of these parameters include at least one member selected from the group of: pen movement in the X direction; pen movement in the Y direction; pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the X direction; velocity or acceleration of pen movement in the Y direction; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation. While the following description will primarily describe use of steadiness and stroke size as two parameters for determining whether a press-and-hold action is intended, those skilled in the art will appreciate that any suitable parameter, including those mentioned above, may be used without departing from the invention. Additionally, while use of two parameters is described in the specific examples that follow, those skilled in the art will appreciate that any suitable number of parameters and/or combinations of the above parameters may be used in the determination without departing from the invention.

Figure 7:
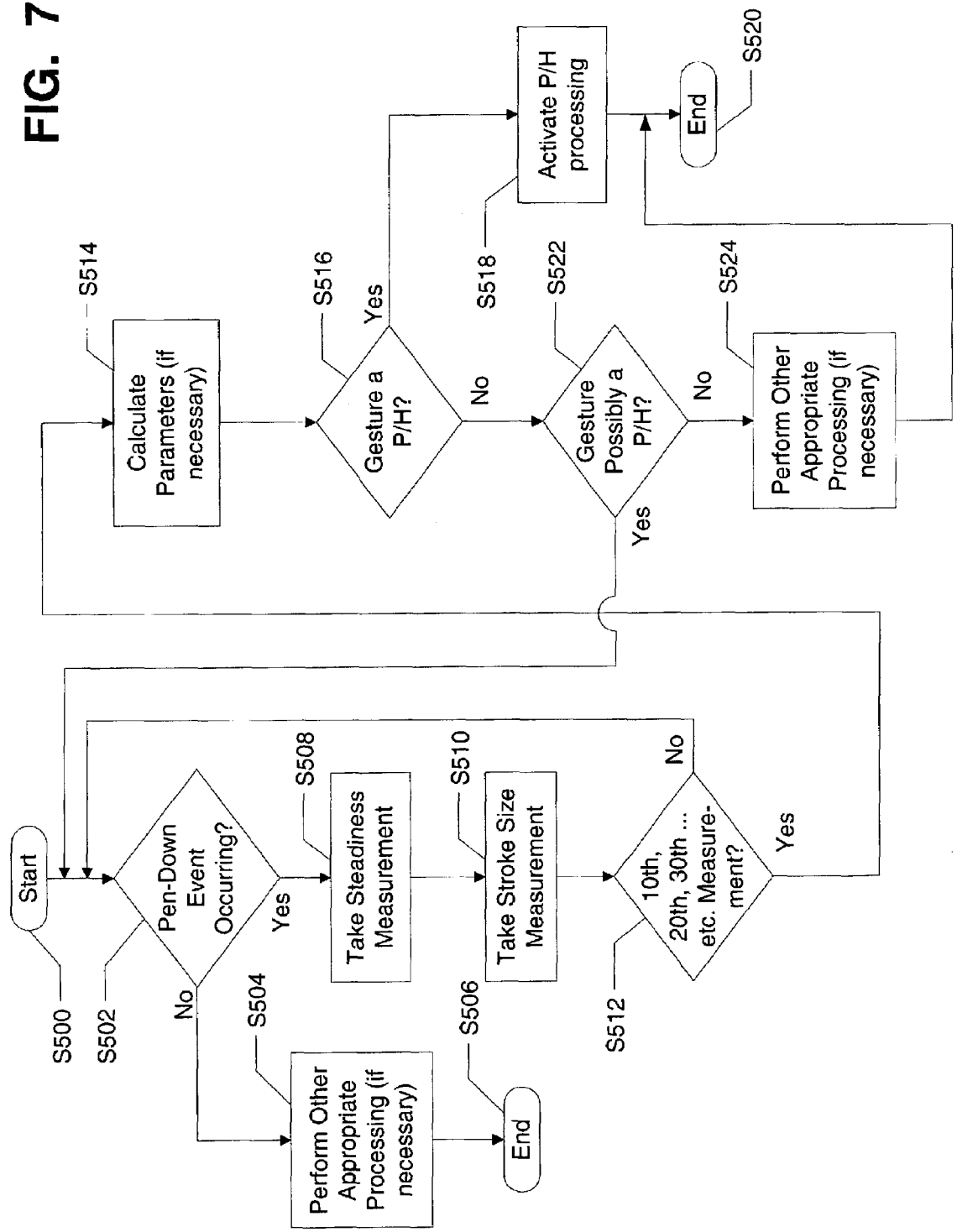
FIG. 7 illustrates a flow diagram describing procedures useful according to some examples of this invention.

FIG. 7 includes a flow diagram illustrating an example process for determining whether a specific gesture constitutes a press-and-hold action useful in accordance with some examples of this invention. As the procedure starts (S500), systems and methods according to this example of the invention determine whether a "pen-down" event is occurring S502 (e.g., whether a pen has contacted or come proximate to a digitizer screen surface). If not (answer NO), systems and methods according to this example of the invention may perform other processing S504, if necessary, and end the present process S506 (which may include, for example, moving on to other processing and/or waiting for additional user input).

If a pen-down event is occurring at S502 (answer YES), the systems and methods according to this example of the invention take a steadiness measurement S508 (e.g., by determining the X and Y coordinates of the pen tip, as described above) and a stroke size measurement S510 (e.g., by determining overall stroke width and height, as described above).

As generally described above, pen-based computing systems, including those capable of operating with the present invention, typically are capable of frequently providing the underlying data used in making the steadiness measurement and the stroke size measurement (e.g., every 7.5 ms). While a press-and-hold determination could be conducted anew each time data relating to the steadiness measurement and/or the stroke size measurement are measured, doing so may unnecessarily tie up computing system resources, particularly in the early stages of measurement when little data is available and when there is a low likelihood of being able to positively determine that a press-and-hold action was intended by the user. Accordingly, in this example of the invention, the processing to determine whether a user intended a press-and-hold operation is conducted once every ten measurement cycles (e.g., after the $10^{th}$, $20^{th}$, $30^{th}$, etc. measurement cycles, which correspond to 75 ms, 150 ms, 225 ms, etc., in some systems and methods). As is readily apparent, the press-and-hold determination can be made at any time, after any number of measurement cycles (even after every measurement, if desired) and/or the frequency of making the press-and-hold determination may change over the course of the pen-down event, without departing from the invention.

By conducting press-and-hold determination processing after every ten measurement cycles or at another desired interval, systems and methods according to this example of the invention, at least some times, can make an early determination as to whether a gesture does or does not constitute a press-and-hold action. For example, continuous and/or rapid movement of the pen with respect to the digitizer surface (e.g., very low steadiness and/or very high width to height ratio and/or very high stroke size) may result in an early conclusion that the gesture cannot constitute a press-and-hold. As another example, a very steady pen location may result in an early determination that the gesture constitutes a press-and-hold attempt. If desired, a positive determination of press-and-hold may require a predetermined minimum number of measurement cycles, such as measurements over 300 ms, 400 ms, 450 ms, or the like. Accordingly, frequently performing the press-and-hold processing allows some of these more readily recognized cases to be processed more quickly, which helps reduce processing delays observed by the user (i.e., a user need not wait a full 750 ms-1000 ms every time press-and-hold processing is activated).

Returning to FIG. 7, in accordance with this example of the invention, after the underlying data used in the steadiness and stroke size measurements are taken (S508 and S510), the system next determines whether this is the $10^{th}$, $20^{th}$, $30^{th}$, etc. measurement cycle (S512). If not (answer NO), the procedure returns to step S502 and repeats steps S502, S504, S506, S508, and/or S510 as appropriate. If the answer at S512 is YES, then the processing is performed to determine whether a press-and-hold gesture is intended by the user. As a first step in this example procedure, the measurement values since the pen-down event initiated are processed (if necessary) to provide the various parameters needed for the determination (S514). This may include, for example, calculating the average steadiness factor S and/or the W/H ratio for the stroke, as described above. Once the parameters are available, systems and methods according to this example of the invention use the parameters to next determine whether the gesture can be designated as a press-and-hold gesture (S516). This determination may be accomplished in any suitable manner without departing from the invention, and one example method will be described in more detail below, in conjunction with FIGS. 8a through 8d. A minimum press-and-hold time period, as described above, may be a factor considered in determining whether a gesture is a press-and-hold in S516.

If, at S516, it is determined that the gesture constitutes a press-and-hold gesture (answer YES), press-and-hold processing is activated (S518), which may result in display of a drop down menu or initiation of other processing, and the procedure ends (S520), e.g., waits for the next user input.

If, however, at S516, it cannot be determined whether or not the gesture is a press-and-hold gesture (answer NO, e.g., because the data is insufficient or indeterminant or because not enough time has expired), the system next determines whether the gesture could still possibly constitute a press-and-hold gesture (S522). For example, for narrow strokes (low width to height ratio) or reasonably steady strokes, additional data measurements (e.g., time) and processing may allow the systems and methods according to this example of the invention to positively determine that a press-and-hold gesture was intended. Accordingly, for gestures that could still conceivably constitute press-and-hold gestures but cannot be determined as such at the current measurement level (answer YES at S522), processing returns to S502 in which another set of ten measurements may be made (S508 and S510, assuming that the pen-down event continues throughout this additional time period—if the pen-down event terminates before a press-and-hold gesture can be determined (answer NO at S502), the system determines that a press-and-hold was not intended, and other processing is performed (if necessary, S504)).

If, at S522, it is determined that the gesture cannot possibly constitute a press-and-hold gesture (answer NO), other processing may be performed, if necessary (S524), and the procedure will end (S520) (e.g., await other user input and/or perform other processing). The other processing may include, for example, treating the pen-down event as a new ink input stroke, treating the pen-down event as a selection action, etc.

Various reasons may result in a determination that a gesture cannot possibly constitute a press-and-hold action (answer NO at S522). For example, continuous and/or rapid movement of the pen with respect to the digitizer surface (very low steadiness and/or very high width to height ratio) may result in an early determination that the gesture cannot constitute a press-and-hold. As another example, if a press-and-hold determination time out occurs (e.g., if a press-and-hold cannot be confirmed within a predetermined time period, such as 1 second), then no press-and-hold processing will commence. Various other factors and/or parameters also may be taken into consideration in determining whether a press-and-hold action is still possibly intended.

Also, the procedures described in conjunction with FIG. 7 are merely examples of processing suitable for use in some examples of this invention. The invention is not limited to the specific steps described in FIG. 7 and/or to systems that can perform only those specific steps. The skilled artisan will recognize that various different parameters may be measured and/or used in the various determinations, additional steps may be performed, the order of the various steps may be changed, certain steps may be deleted, at least in some instances, and the like, without departing from the invention.

Any suitable algorithm or method can be used to determine whether a press-and-hold gesture is intended from the parameters involved in the determination. For example, based on the measured parameters, a "look-up table" or a function may be devised to determine whether a specific set or combination of parameter values constitutes a press-and-hold gesture, whether the specific set or combination of parameter values constitutes some other action (such as an ink stroke, a selection action, or the like), and/or whether the character of the gesture cannot yet be determined based on the calculated or determined parameter values.

Figure 8B:
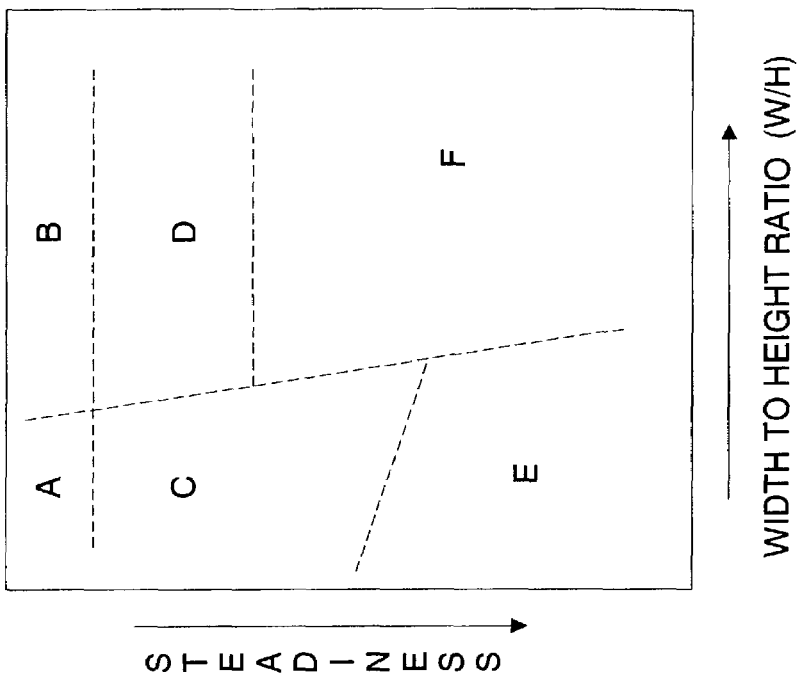
FIGS. 8a through 8d help illustrate how measured parameters can be used to determine whether specific dwell gestures constitute press-and-hold actions or some other actions.
Figure 8A:
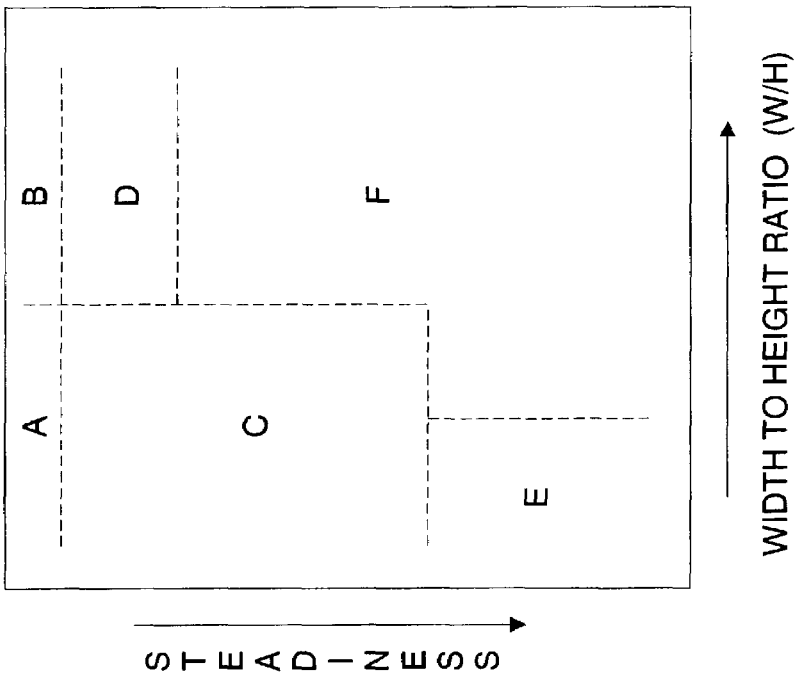
Figure 8D:
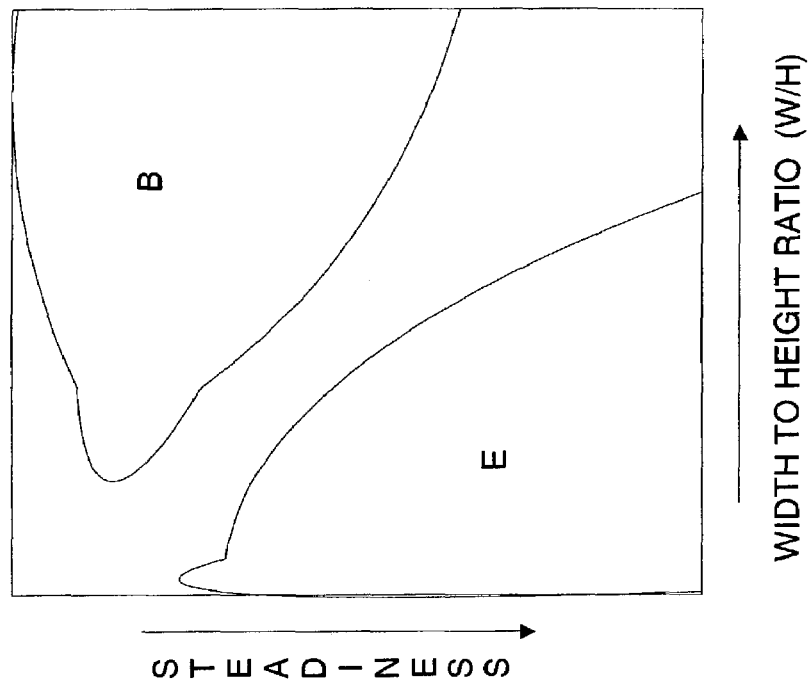
Figure 8C:
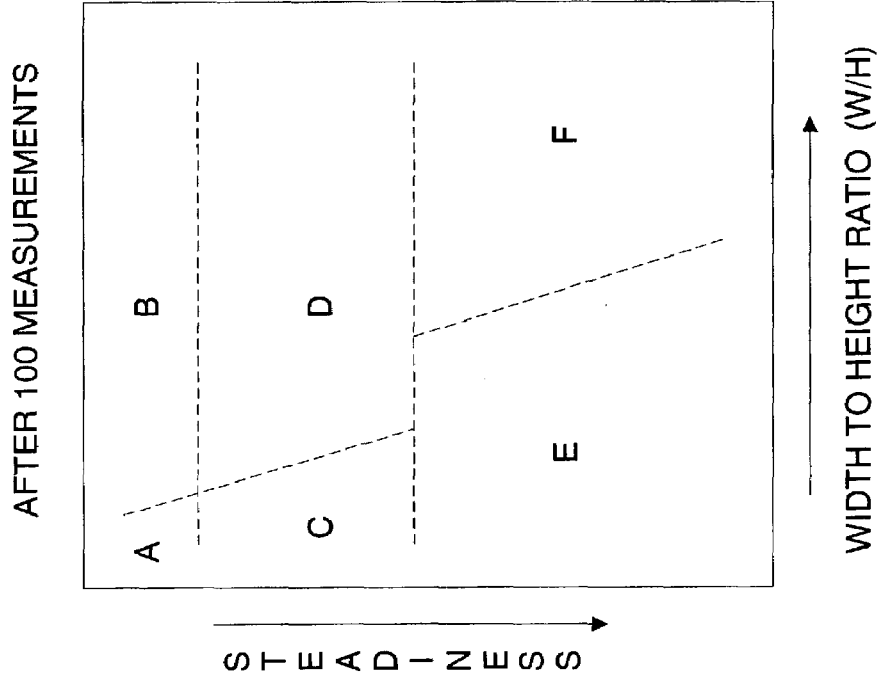

FIGS. 8a through 8d illustrate examples of various charts or "look-up tables" that may be prepared and used to enable determination of whether certain gestures (in terms of their measured parameters) constitute a press-and-hold gesture or some other action. Specifically, in the examples illustrated in FIGS. 8a through 8d, the steadiness parameter is charted along the vertical axis (increasing steadiness moving downward) and the stroke width to height ratio (or another stroke size parameter) is charted along the horizontal axis (increasing ratio as you move to the right). As noted, FIG. 8a illustrates an example look-up table for use after ten measurement cycles from the procedure of FIG. 7, FIG. 8b illustrates an example look-up table for use after twenty measurement cycles, and FIG. 8c illustrates an example look-up table for use after 100 measurement cycles. Because there is relatively little available data early in the pen-down event (e.g., after ten measurement cycles), the look-up table for use after ten measurement cycles (FIG. 8a) may be quite conservative, allowing a positive determination of press-and-hold only for extremely steady and narrow strokes (region E) and allowing a positive determination of a select action only for very rapidly moving and/or wide strokes (region B). At this measurement level, strokes having parameters placing them within regions A, C, D, and F cannot be determined (as noted above, if desired, determination of a press-and-hold action may require some predetermined minimum number of measurement cycles, such as 30-50 cycles). After 20 measurement cycles, however, the look-up table (FIG. 8b) may become somewhat more aggressive because a larger amount of data has been used in the measurement. Accordingly, as illustrated in FIG. 8b, regions B and E have become somewhat larger at the expense of the other regions (A, C, D, and F). Different "look-up" tables or functions may be provided at each processing level. After 100 measurements, regions B and E have become larger still at the expense of the other regions (see FIG. 8c).

The locations of the various region dividing lines in the look-up tables may be determined in any suitable manner without departing from the invention. For example, the locations of the various lines may be determined using empirical data obtained from a large number of users using pen-based computing systems. Moreover, the various dividing lines need not be straight lines. Rather, as illustrated in FIG. 8d, curving, irregular, or non-straight lines may better define the important regions, such as regions B and E.

It should be understood, however, that FIGS. 8a through 8d are merely illustrative examples to help illustrate how the parameters may be used to determine whether a specific gesture constitutes a press-and-hold action. There is no requirement that systems and methods according to the invention actually plot the parameters on a graph and produce or use two (or more) dimensional look-up tables of the type shown in these figures. For example, if appropriate, systems and methods according to some examples of the invention could use numerical tables to provide an indication of the results obtained for various combinations of parameters. As another example, systems and methods according to some examples of the invention may use numerical functions (e.g., derived from actual user input data) that determine whether specific combinations of input parameters constitute a press-and-hold action. An example of this type of function may include, for example:

$$F(x,y)=K_1x+K_2y+K_3,$$

wherein: x represents the first parameter (e.g., a determined or calculated steadiness parameter); y represents the second parameter (e.g., a determined or calculated width to height ratio); $K_1$, $K_2$, and $K_3$ are constants (e.g., derived and/or obtained from empirical data); and F(x,y) represents a calculated value of the function. In this example: (a) for F(x,y)>a predetermined standard value A, the gesture is determined to be a press-and-hold action (the steadiness factor dominates); (b) for F(x,y)<a predetermined standard value B, the gesture is determined to not be a press-and-hold action (it may be a select or a stroke or other appropriate action; the width to height ratio dominates); and (c) for B<F(x,y)<A, the result is indeterminate, and the system will either continue with additional measurements and/or time out without activating the press-and-hold processing. A and B represent predetermined standard values (e.g., derived and/or obtained from empirical data). A, B, $K_1$, $K_2$, and $K_3$ may change, depending on various factors, such as the number of measurements made, individual user input, etc.

Moreover, it is not necessary, in all instances, that at least two parameters be used to make a final determination as to whether a specific gesture constitutes a press-and-hold action. For example, rapidly moving strokes may be determined to constitute something other than a press-and-hold based solely on the steadiness parameter, the width/height ratio parameter, a pen tip velocity parameter, or the like. In this example, the non-press-and-hold determination also can be made quickly, after very few measurement cycles.

Additional features of some examples of this invention allow the systems and methods to customize the press-and-hold determination based on the specific user's characteristics. In this manner, systems and methods according to at least some examples of the invention could make press-and-hold gestures easier to activate in some cases and/or for some users (e.g., for users unable to hold a pen very steady) and more difficult in other cases and/or for other users (e.g., to quickly activate press-and-hold processing and to prevent unwanted press-and-hold activation for users that typically are very steady). In some of these examples of systems and methods according to the invention, at least one standard for determining whether a specific gesture constitutes a press-and-hold gesture may be set and/or adjusted based on user input. For example, when setting up the operating system or initially logging onto the system, a user could be prompted to supply one or more "sample" press-and-hold operations, and this sample data could be used to set and/or adjust standards for determining whether an action constitutes a press-and-hold.

Additionally, or alternatively, the system could "learn" about a specific user's press-and-hold tendencies as the user becomes familiar with and uses the pen-based computing system and performs numerous press-and-hold operations. For example, systems and methods according to the invention could: (a) note characteristics of successful press-and-hold actions performed by a user; (b) note characteristics of instances when a user quickly closes a press-and-hold operation without taking action (indicating that an erroneous press-and-hold activation took place); and/or (c) note characteristics of instances when a user successfully performs a press-and-hold action immediately after one or more instances when a press-and-hold was not activated by the system (indicating that press-and-hold was attempted but not successfully activated). As another example, the system could include a menu item present after press-and-hold activation that allows the user to close the press-and-hold menu and informs the system that the menu was activated erroneously (e.g., when the press-and-hold menu is activated, it may be closed in various ways, such as by tapping the pen elsewhere on the screen, by tapping a "close" button on the menu, or by tapping a "close-press-and-hold erroneously activated" button on a menu). These characteristics and information may be used to set and/or adjust standards in the system for determining whether or not a pen-down event constitutes a press-and-hold action. As another example, sample user press-and-hold input may be requested occasionally as the user gains experience with the system.

The various standards may be set and/or adjusted in any suitable manner without departing from the invention. For example, in the two-dimensional look-up tables illustrated in FIGS. 8a through 8d, the sample user press-and-hold input data and/or past press-and-hold usage characteristics could be used to set and/or adjust the locations of one or more lines in the table (or used to adjust values in the numerical tables stored in the system). As another example, the sample user press-and-hold input data and/or past press-and-hold usage characteristics could be used to set and/or adjust the constants $K_1$, $K_2$, and $K_3$ and/or the predetermined standard values A and/or B in the function F(x,y) described above. Any other suitable way of using the sample user press-and-hold input data and/or past press-and-hold usage characteristics to set and/or adjust the standards for determining whether a pen-down event constitutes a press-and-hold action may be used without departing from the invention.

Figure 9:
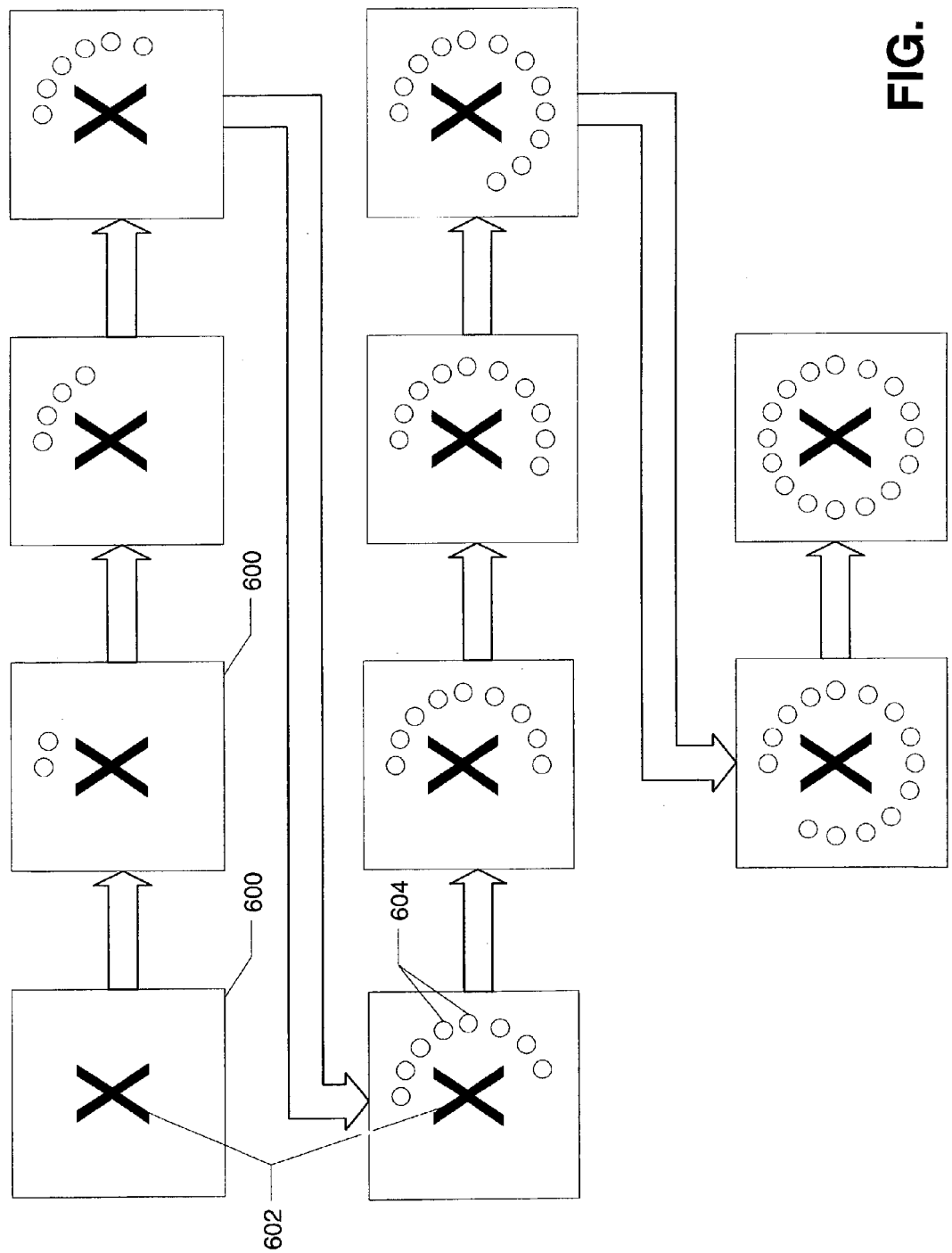
FIG. 9 illustrates a drawing series in which an indicator is provided on the computer screen to show that press-and-hold processing is underway.

FIG. 9 illustrates an example of the appearance of a computer display screen while the processing described in FIG. 7 is conducted in some examples of the invention. In some instances, determination of whether a press-and-hold has occurred can take some time, and the user may note this processing delay time period, in at least some instances. In order to inform the user that some processing is occurring and when it is completed, the user's display screen 600 may change in a suitable manner, such as in the manner illustrated in FIG. 9. Specifically, in FIG. 9, the "X" 602 marks the spot where the pen-down event occurred (although not necessary, the "X" or another appropriate marking or cursor may appear on the actual display screen while this processing takes place). Once the pen-down event begins, processing also begins to determine whether this event constitutes a press-and-hold gesture, for example, as described in conjunction with FIG. 7. Accordingly, in at least some examples of the invention, a series of symbols 604 will appear around the pen tip, and the number of symbols 604 in the series will grow as the processing time continues. This action informs the user (a) that press-and-hold processing is occurring and (b) when the press-and-hold processing has been completed. If, at any time during the processing, a positive press-and-hold attempt is determined or a non-press-and-hold event is determined, processing can cease immediately, the symbols 604 can disappear, and/or other suitable processing can continue or commence.

Of course, any suitable types of visual and/or audio processing indicators can be used without departing from the invention. For example, a clock, hourglass, and/or any suitable icon could appear, alternatively or optionally along with an audio indicator, to indicate that a press-and-hold determination is being made.

Finally, the present invention also relates to computer-readable media including computer-executable instructions stored thereon for performing the various methods and/or for use in the various systems described above. The computer-readable media may constitute computer-executable instructions stored on the various specific examples described above.

E. CONCLUSION

Various examples of the present invention have been described above, and it will be understood by those familiar with this art that the present invention includes within its scope all combinations and subcombinations of these examples. Additionally, those familiar with the art will recognize that the above examples simply exemplify various aspects of the invention. Various changes and modifications may be made without departing from the spirit and scope of the invention, as defined in the appended claims.

We claim:

1. A method, comprising:
   (a) measuring values of a first parameter associated with pen interaction or orientation with respect to a digitizer over a first predetermined time period during a pen-down event;
   (b) measuring values of a second parameter associated with pen interaction or orientation with respect to the digitizer over the first predetermined time period during the pen-down event, wherein the second parameter differs from the first parameter;
   (c) comparing the first parameter values and the second parameter values to predetermined parameter values corresponding to a press-and-hold gesture;
   (d) at the end of the first predetermined time period, based on said comparison, determining whether (i) the pen-down event constitutes a press-and-hold gesture, (ii) the pen-down event does not constitute a press-and-hold gesture, or (iii) the first and the second parameter values provide insufficient data for determining whether the pen-down event constitutes a press-and-hold gesture;
   (e) when the first and the second parameter values provide insufficient data for determining whether the pen-down event constitutes a press-and-hold gesture in the first predetermined time period, repeating at least steps (a), (b), and (c) over a second predetermined time period with additional data collected relating to the first parameter and the second parameter since the previous measurings during steps (a) and (b); and
   (f) when the pen-down event is determined to constitute a press-and-hold gesture, processing the event as a press-and-hold gesture.

2. A method according to claim 1, wherein at least one of the first parameter and the second parameter comprises a pen steadiness parameter based on a plurality of pen steadiness measurements taken for a plurality of time intervals.

3. A method according to claim 1, wherein the first parameter comprises a pen steadiness parameter based on a steadiness factor.

4. A method according to claim 1, wherein at least one of the first parameter and the second parameter includes a stroke width to height ratio.

5. A method according to claim 4, wherein when the stroke width to height ratio exceeds a predetermined value, the pen-down event is determined not to constitute a press-and-hold gesture.

6. A method according to claim 1, wherein the determining whether the pen-down event constitutes a press-and-hold gesture is based, at least in part, on the previous measurements during steps (a) and (b).

7. A method according to claim 1, further comprising:
   adjusting at least one standard for determining whether the pen-down event constitutes a press-and-hold gesture based on previous determinations of whether previous pen-down events constituted press-and-hold gestures.

8. A method according to claim 1, further comprising:
   setting at least one standard for determining whether the pen-down event constitutes a press-and-hold gesture based, at least in part, on model user press-and-hold gesture input.

9. A method according to claim 1, wherein at least one of the first parameter and the second parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

10. A method according to claim 1, wherein measuring the first parameter and measuring the second parameter over the first predetermined time period comprises performing a plurality of measurements of the first parameter and the second parameter at multiple time intervals during the first predetermined time period.

11. A system, comprising:
    a digitizer for receiving input; and
    a processor for: (a) measuring values of a first parameter associated with pen interaction or orientation with respect to the digitizer over a first predetermined time period during a pen-down event, (b) measuring values of a second parameter associated with pen interaction or orientation with respect to the digitizer over the first predetermined time period during the pen-down event, wherein the second parameter differs from the first parameter, (c) comparing the first parameter values and the second parameter values to predetermined parameter values corresponding to a press-and-hold gesture, (d) at the end of the first predetermined time period, based on said comparison, determining whether (i) the pen-down event constitutes a press-and-hold gesture, (ii) the pen-down event does not constitute a press-and-hold gesture, or (iii) the first and the second parameter values provide insufficient data for determining whether the pen-down event constitutes a press-andhold gesture; (e) when the first and the second parameter values provide insufficient data for determining whether the pen-down event constitutes a press-and-hold gesture in the first predetermined time period, repeating at least steps (a), (b), and (c) over a second predetermined time period with additional data collected relating to the first parameter and the second parameter since the previous measurings during steps (a) and (b), and (f) when the pen-down event is determined to constitute a press-and-hold gesture, processing the event as a press-and-hold gesture.

12. A system according to claim 11, wherein at least one of the first parameter and the second parameter comprises a pen steadiness parameter based on a plurality of pen steadiness measurements taken for a plurality of time intervals.

13. A system according to claim 11, wherein the first parameter comprises a pen steadiness parameter based on a steadiness factor.

14. A system according to claim 11, wherein at least one of the first parameter and the second parameter includes a stroke width to height ratio.

15. A system according to claim 14, wherein when the stroke width to height ratio exceeds a predetermined value, the processor determines that the pen-down event does not constitute a press-and-hold gesture.

16. A system according to claim 11, wherein the determining whether the pen-down event constitutes a press-and-hold gesture is based, at least in part, on the previous measurements during steps (a) and (b).

17. A system according to claim 11, further comprising:
means for adjusting at least one standard for determining whether the pen-down event constitutes a press-and-hold gesture based on previous determinations of whether previous pen-down events constituted press-and-hold gestures.

18. A system according to claim 11, further comprising:
means for setting at least one standard for determining whether the pen-down event constitutes a press-and-hold gesture based, at least in part, on model user press-and-hold gesture input.

19. A system according to claim 11, wherein at least one of the first parameter and the second parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

20. A system according to claim 11, wherein measuring the first parameter and measuring the second parameter over the first predetermined time period comprises performing a plurality of measurements of the first parameter and the second parameter at multiple time intervals during the first predetermined time period.

21. A computer-readable medium including computer-executable instructions stored thereon for performing a method, comprising:

(a) measuring values of a first parameter associated with pen interaction or orientation with respect to a digitizer over a first predetermined time period during a pen-down event;
(b) measuring values of a second parameter associated with pen interaction or orientation with respect to the digitizer over the first predetermined time period during the pen-down event, wherein the second parameter differs from the first parameter;
(c) comparing the first parameter values and the second parameter values to predetermined parameter values corresponding to a press-and-hold gesture;
(d) at the end of the first predetermined time period, based on said comparison, determining whether (i) the pen-down event constitutes a press-and-hold gesture, (ii) the pen-down event does not constitute a press-and-hold gesture, or (iii) the first and the second parameter values provide insufficient data for determining whether the pen-down event constitutes a press-and-hold gesture;
(e) when the first and the second parameter values provide insufficient data for determining whether the pen-down event constitutes a press-and-hold gesture in the first predetermined time period, repeating at least steps (a), (b), and (c) over a second predetermined time period with additional data collected relating to the first parameter and the second parameter since the previous measurings during steps (a) and (b); and
(f) when the pen-down event is determined to constitute a press-and-hold gesture, processing the event as a press-and-hold gesture.

22. A computer-readable medium according to claim 21, wherein at least one of the first parameter and the second parameter comprises a pen steadiness parameter based on a plurality of pen steadiness measurements taken for a plurality of time intervals.

23. A computer-readable medium according to claim 21, wherein the first parameter comprises a pen steadiness parameter based on a steadiness factor.

24. A computer-readable medium according to claim 21, wherein at least one of the first parameter and the second parameter includes a stroke width to height ratio.

25. A computer-readable medium according to claim 24, wherein when the stroke width to height ratio exceeds a predetermined value, the pen-down event is determined not to constitute a press-and-hold gesture.

26. A computer-readable medium according to claim 21, wherein the determining whether the pen-down event constitutes a press-and-hold gesture is based, at least in part, on the previous measurements during steps (a) and (b).

27. A computer-readable medium according to claim 21, wherein the method further comprises adjusting at least one standard for determining whether the pen-down event constitutes a press-and-hold gesture based on previous determinations of whether previous pen-down events constituted press-and-hold gestures.

28. A computer-readable medium according to claim 21, wherein the method further comprises setting at least one standard for determining whether the pen-down event constitutes a press-and-hold gesture based, at least in part, on model user press-and-hold gesture input.

29. A computer-readable medium according to claim 21, wherein at least one of the first parameter and the second parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

30. A computer-readable medium according to claim 21, wherein measuring the first parameter and measuring the second parameter over the first predetermined time period comprises performing a plurality of measurements of the first parameter and the second parameter at multiple time intervals during the first predetermined time period.

31. A method, comprising:
performing a first plurality of measurements over a first predetermined time period of at least one parameter associated with pen interaction with respect to a digitizer during a pen-down event;
after completion of the first predetermined time period, determining based on the first plurality of measurements if the pen-down event constitutes a press-and-hold gesture;
when the pen-down event is determined to constitute a press-and-hold gesture, processing the event as a press-and-hold gesture; and
when the pen-down event is determined to provide insufficient data to determine if the event constitutes a press-and-hold gesture, performing the additional steps of:
performing a second plurality of measurements over a second predetermined time period of the at least one parameter during the pen-down event; and
after completion of the second predetermined time period, determining based at least in part on the second plurality of measurements whether the pen-down event constitutes a press-and-hold gesture.

32. The method of claim 31, wherein the at least one parameter includes a pen steadiness parameter based on a plurality of pen steadiness measurements taken for a plurality of time intervals.

33. The method of claim 31, wherein the at least one parameter includes a pen steadiness parameter based on a steadiness factor.

34. The method of claim 31, wherein the at least one parameter includes a stroke width to height ratio.

35. The method of claim 31, wherein after completion of the second predetermined time period, the determining if the pen-down event constitutes a press-and-hold gesture is based at least in part on the first plurality of measurements and the second plurality of measurements.

36. The method of claim 31, wherein the determining if the pen-down event constitutes a press-and-hold gesture is based at least in part on previous determinations of whether previous pen-down events constituted press-and-hold gestures.

37. The method of claim 31, further comprising:
setting at least one standard for determining if the pen-down event constitutes a press-and-hold gesture based, at least in part, on model user press-and-hold gesture input.

38. The method of claim 31, wherein the at least one parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

39. The method of claim 31, wherein the at least one parameter includes a pen angle parameter.

40. The method of claim 31, wherein the at least one parameter includes a pen pressure parameter.

41. A computer-readable medium including computer-executable instructions stored thereon for performing a method, comprising:
performing a first plurality of measurements over a first predetermined time period of at least one parameter associated with pen interaction with respect to a digitizer during a pen-down event;
after the completion of the first predetermined time period, determining based on the first plurality of measurements if the pen-down event constitutes a press-and-hold gesture;
when the pen-down event is determined to constitute a press-and-hold gesture, processing the event as a press-and-hold gesture; and
when the pen-down event is determined to provide insufficient data to determine if the event constitutes a press-and-hold gesture, performing the additional steps of:
performing a second plurality of measurements over a second predetermined time period of the at least one parameter during the pen-down event; and
after completion of the second predetermined time period, determining based at least in part on the second plurality of measurements whether the pen-down event constitutes a press-and-hold gesture.

42. The computer-readable medium of claim 41, wherein the at least one parameter includes a pen steadiness parameter based on a plurality of pen steadiness measurements taken for a plurality of time intervals.

43. The computer-readable medium of claim 41, wherein the at least one parameter includes a pen steadiness parameter based on a steadiness factor.

44. The computer-readable medium of claim 41, wherein the at least one parameter includes a stroke width to height ratio.

45. The computer-readable medium of claim 41, wherein after completion of the second predetermined time period, the determining if the pen-down event constitutes a press-and-hold gesture is based at least in part on the first plurality of measurements and the second plurality of measurements.

46. The computer-readable medium of claim 41, wherein the determining if the pen-down event constitutes a press-and-hold gesture is based at least in part on previous determinations of whether previous pen-down events constituted press-and-hold gestures.

47. The computer-readable medium of claim 41, further comprising:

setting at least one standard for determining if the pen-down event constitutes a press-and-hold gesture based, at least in part, on model user press-and-hold gesture input.

48. The computer-readable medium of claim 41, wherein the at least one parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

49. The computer-readable medium of claim 41, wherein the at least one parameter includes a pen angle parameter.

50. The computer-readable medium of claim 41, wherein the at least one parameter includes a pen pressure parameter.

51. A system, comprising:
a digitizer for receiving input; and
a processor for:
performing a first plurality of measurements over a first predetermined time period of at least one parameter associated with pen interaction with respect to a digitizer during a pen-down event;
after the completion of the first predetermined time period, determining based on the first plurality of measurements if the pen-down event constitutes a press-and-hold gesture;
when the pen-down event is determined to constitute a press-and-hold gesture, processing the event as a press-and-hold gesture; and
when the pen-down event is determined to provide insufficient data to determine if the event constitutes a press-and-hold gesture, performing the additional steps of:
performing a second plurality of measurements over a second predetermined time period of the at least one parameter during the pen-down event; and
after completion of the second predetermined time period, determining based at least in part on the second plurality of measurements whether the pen-down event constitutes a press-and-hold gesture.

52. The system of claim 51, wherein the at least one parameter includes a pen steadiness parameter based on a plurality of pen steadiness measurements taken for a plurality of time intervals.

53. The system of claim 51, wherein the at least one parameter includes a pen steadiness parameter based on a steadiness factor.

54. The system of claim 51, wherein the at least one parameter includes a stroke width to height ratio.

55. The system of claim 51, wherein after completion of the second predetermined time period, the determining if the pen-down event constitutes a press-and-hold gesture is based at least in part on the first plurality of measurements and the second plurality of measurements.

56. The system of claim 51, wherein the determining if the pen-down event constitutes a press-and-hold gesture is based at least in part on previous determinations of whether previous pen-down events constituted press-and-hold gestures.

57. The system of claim 51, the processor further sets at least one standard for determining if the pen-down event constitutes a press-and-hold gesture based, at least in part, on model user press-and-hold gesture input.

58. The system of claim 51, wherein the at least one parameter includes at least one member selected from the group of: pen movement in the Z direction; pen pressure normal to the digitizer; pen pressure tangent to the digitizer; pen button pressure; pen X direction tilt orientation; pen Y direction tilt orientation; pen azimuth orientation; pen altitude orientation; pen twist orientation; pen pitch rotation; pen roll rotation; pen yaw rotation; velocity or acceleration of pen movement in the Z direction; change in pen pressure normal to the digitizer; change in pen pressure tangent to the digitizer; change in pen button pressure; change in pen X direction tilt orientation; change in pen Y direction tilt orientation; change in pen azimuth orientation; change in pen altitude orientation; change in pen twist orientation; change in pen pitch rotation; change in pen roll rotation; and change in pen yaw rotation.

59. The system of claim 51, wherein the at least one parameter includes a pen angle parameter.

60. The system of claim 51, wherein the at least one parameter includes a pen pressure parameter.

* * * * *